(12) United States Patent
Kanberoglu et al.

(10) Patent No.: US 12,236,608 B2
(45) Date of Patent: Feb. 25, 2025

(54) JUDDER DETECTION FOR DYNAMIC FRAME RATE CONVERSION

(71) Applicant: Samsung Electronics Co., Ltd., Suwon-si (KR)

(72) Inventors: Berkay Kanberoglu, Long Beach, CA (US); Hunsop Hong, Irvine, CA (US); Seongnam Oh, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/482,023

(22) Filed: Sep. 22, 2021

(65) Prior Publication Data

US 2023/0088882 A1 Mar. 23, 2023

(51) Int. Cl.
*G06T 7/13* (2017.01)
*G06T 7/44* (2017.01)
*H04N 19/577* (2014.01)

(52) U.S. Cl.
CPC .......... *G06T 7/13* (2017.01); *G06T 7/44* (2017.01); *G06T 2207/10016* (2013.01); *H04N 19/577* (2014.11)

(58) Field of Classification Search
CPC .. H04N 7/0127; H04N 19/577; H04N 19/132; H04N 19/137; H04N 19/172; H04N 19/14; G09G 2340/0435; G09G 5/12; G06T 2207/10016; G06T 7/254; G06T 7/13; G06T 7/10; G06T 7/44
See application file for complete search history.

(56) References Cited

U.S. PATENT DOCUMENTS

| 8,837,593 B2 * | 9/2014 | Nishi .................. H04N 7/0112 |
| | | 375/240.18 |
| 9,552,623 B1 * | 1/2017 | Cheng .................... H04N 7/014 |

(Continued)

FOREIGN PATENT DOCUMENTS

| JP | 5480674 B2 | 2/2014 |
| JP | 6332037 | 5/2018 |

(Continued)

OTHER PUBLICATIONS

International Search Report & Written Opinion dated Dec. 14, 2022 for International Application PCT/KR2022/013854 from Korean Intellectual Property Office, pp. 1-7, Republic of Korea.

*Primary Examiner* — Henok Shiferaw
*Assistant Examiner* — Woo C Rhim
(74) *Attorney, Agent, or Firm* — Sherman IP LLP; Kenneth L. Sherman; Hemavathy Perumal

(57) ABSTRACT

One embodiment provides a method comprising generating, via an edge detection algorithm, a first edge map based on a first frame of an input content comprising a sequence of frames. The method further comprises generating, via the edge detection algorithm, a second edge map based on a second frame of the input content. The first frame precedes the second frame in the sequence of frames. The method further comprises determining a difference between the first edge map and the second edge map, determining a metric indicative of an estimated amount of judder present in the input content based on the difference, and dynamically adjusting a frame rate of the input content based on the metric. The input content is displayed on a display device at the adjusted frame rate.

17 Claims, 8 Drawing Sheets

(56) References Cited

U.S. PATENT DOCUMENTS

| | | | |
|---|---|---|---|
| 9,582,061 B2* | 2/2017 | Pylappan | G06F 3/14 |
| 9,661,261 B2* | 5/2017 | Lin | H04N 7/012 |
| 10,110,817 B2* | 10/2018 | Sutou | G02B 27/0172 |
| 10,284,870 B1* | 5/2019 | Yang | H04N 19/513 |
| 10,432,946 B2* | 10/2019 | Su | H04N 19/177 |
| 10,778,881 B2* | 9/2020 | Kamiya | H04N 23/951 |
| 10,817,979 B2* | 10/2020 | Kim | G06T 3/0062 |
| 10,834,337 B2* | 11/2020 | Wadelius | H04N 23/684 |
| 10,944,938 B2 | 3/2021 | Xu et al. | |
| 10,965,905 B2* | 3/2021 | San | H04N 7/0127 |
| 11,165,848 B1* | 11/2021 | Larson | H04N 19/154 |
| 2003/0138163 A1* | 7/2003 | Chen | G06T 7/13 |
| | | | 382/274 |
| 2007/0200838 A1* | 8/2007 | Lee | G09G 5/12 |
| | | | 345/204 |
| 2010/0020233 A1* | 1/2010 | Ueno | H04N 7/0135 |
| | | | 348/E7.003 |
| 2010/0091185 A1* | 4/2010 | Ueno | G09G 3/3611 |
| | | | 348/E7.003 |
| 2010/0128169 A1* | 5/2010 | Yi | H04N 7/0125 |
| | | | 348/E7.003 |
| 2010/0178038 A1* | 7/2010 | Ju | H04N 21/440281 |
| | | | 375/E7.076 |
| 2011/0050991 A1* | 3/2011 | Bellers | H04N 7/0127 |
| | | | 348/E7.003 |
| 2011/0050992 A1* | 3/2011 | Han | G06T 7/223 |
| | | | 348/E7.003 |
| 2011/0310295 A1* | 12/2011 | Chen | H04N 19/577 |
| | | | 348/E7.003 |
| 2012/0008692 A1* | 1/2012 | Dokou | G06T 3/4007 |
| | | | 375/E7.125 |
| 2014/0036148 A1* | 2/2014 | Tanigawa | H04N 7/0127 |
| | | | 348/448 |
| 2014/0098886 A1* | 4/2014 | Crenshaw | H04N 19/182 |
| | | | 375/240.16 |
| 2014/0293094 A1* | 10/2014 | Bourdon | G06T 5/70 |
| | | | 348/241 |
| 2015/0256804 A1* | 9/2015 | Wen | H04N 9/646 |
| | | | 348/453 |
| 2015/0382015 A1* | 12/2015 | Ahn | H04N 19/577 |
| | | | 375/240.15 |
| 2016/0182911 A1* | 6/2016 | Su | H04N 19/587 |
| | | | 375/240.02 |
| 2017/0054938 A1* | 2/2017 | Xu | H04N 7/0132 |
| 2017/0223308 A1* | 8/2017 | Chen | G06T 7/215 |
| 2017/0264861 A1* | 9/2017 | Xu | H04N 19/157 |
| 2018/0020229 A1* | 1/2018 | Chen | H04N 19/132 |
| 2018/0025686 A1* | 1/2018 | Templin | H04N 5/2625 |
| | | | 348/367 |
| 2018/0082429 A1* | 3/2018 | Choudhury | H04N 21/2343 |
| 2019/0130187 A1* | 5/2019 | Hu | H04N 7/013 |
| 2019/0141287 A1* | 5/2019 | Shoa Hassani Lashdan | G06T 3/4007 |
| 2019/0141332 A1* | 5/2019 | Shoa Hassani Lashdan | H04N 19/59 |
| 2019/0180454 A1* | 6/2019 | Choudhury | H04N 19/139 |
| 2019/0199961 A1* | 6/2019 | Lee | G06T 7/20 |
| 2020/0073887 A1* | 3/2020 | Umesawa | H04N 19/587 |
| 2020/0111195 A1* | 4/2020 | Vlachos | G06F 3/147 |
| 2020/0275050 A1* | 8/2020 | Pytlarz | H04N 19/117 |
| 2021/0044777 A1* | 2/2021 | Zheng | G09G 5/005 |
| 2022/0321889 A1* | 10/2022 | Shoa Hassani Lashdan | H04N 19/172 |

FOREIGN PATENT DOCUMENTS

| | | | |
|---|---|---|---|
| JP | 2019144827 A | * | 8/2019 |
| WO | 2015130616 A3 | | 9/2015 |

\* cited by examiner

JUDDER DETECTION FOR DYNAMIC FRAME RATE CONVERSION

TECHNICAL FIELD

One or more embodiments generally relate to frame rate conversion, in particular, a method and system of judder detection for dynamic frame rate conversion.

BACKGROUND

Judder is a motion artifact that appears as non-smooth motion in displays (e.g., television displays). Typically, judder is more noticeable on a display if the frame rate of content presented on the display is low and the motion of an object (object motion) captured in the content presented is fast.

SUMMARY

One embodiment provides a method comprising generating, via an edge detection algorithm, a first edge map based on a first frame of an input content comprising a sequence of frames. The method further comprises generating, via the edge detection algorithm, a second edge map based on a second frame of the input content. The first frame precedes the second frame in the sequence of frames. The method further comprises determining a difference between the first edge map and the second edge map, determining a metric indicative of an estimated amount of judder present in the input content based on the difference, and dynamically adjusting a frame rate of the input content based on the metric. The input content is displayed on a display device at the adjusted frame rate.

Another embodiment provides a system comprising at least one processor and a non-transitory processor-readable memory device storing instructions that when executed by the at least one processor causes the at least one processor to perform operations. The operations include generating, via an edge detection algorithm, a first edge map based on a first frame of an input content comprising a sequence of frames. The operations further include generating, via the edge detection algorithm, a second edge map based on a second frame of the input content. The first frame precedes the second frame in the sequence of frames. The operations further include determining a difference between the first edge map and the second edge map, determining a metric indicative of an estimated amount of judder present in the input content based on the difference, and dynamically adjusting a frame rate of the input content based on the metric. The input content is displayed on a display device at the adjusted frame rate.

One embodiment provides a non-transitory processor-readable medium that includes a program that when executed by a processor performs a method comprising generating, via an edge detection algorithm, a first edge map based on a first frame of an input content comprising a sequence of frames. The method further comprises generating, via the edge detection algorithm, a second edge map based on a second frame of the input content. The first frame precedes the second frame in the sequence of frames. The method further comprises determining a difference between the first edge map and the second edge map, determining a metric indicative of an estimated amount of judder present in the input content based on the difference, and dynamically adjusting a frame rate of the input content based on the metric. The input content is displayed on a display device at the adjusted frame rate.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
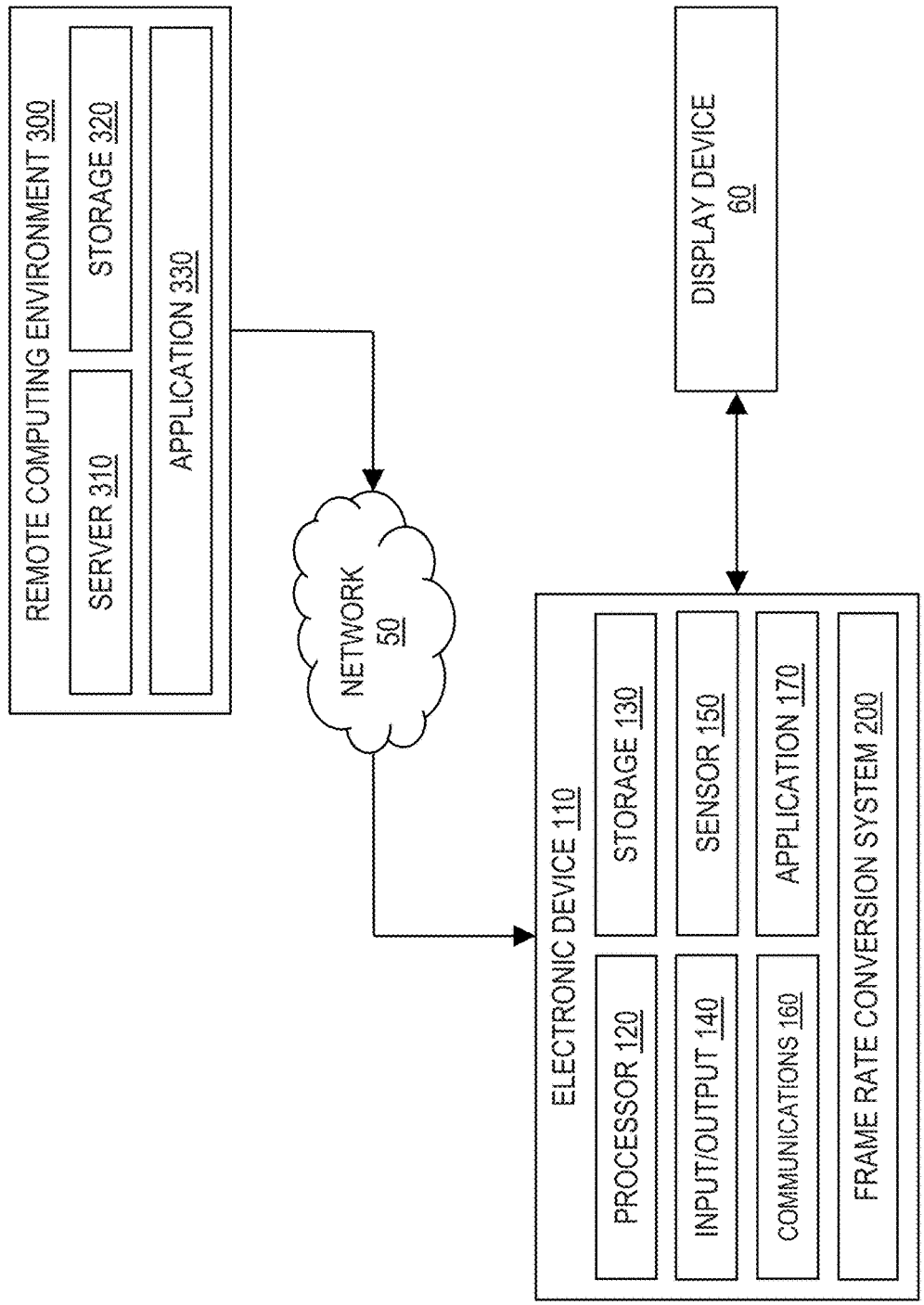
FIG. 1 illustrates an example computing architecture for implementing judder detection for dynamic frame rate conversion, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to frame rate conversion, in particular, a method and system of judder detection for dynamic frame rate conversion. One embodiment provides a method comprising generating, via an edge detection algorithm, a first edge map based on a first frame of an input content comprising a sequence of frames. The method further comprises generating, via the edge detection algorithm, a second edge map based on a second frame of the input content. The first frame precedes the second frame in the sequence of frames. The method further comprises determining a difference between the first edge map and the second edge map, determining a metric indicative of an estimated amount of judder present in the input content based on the difference, and dynamically adjusting a frame rate of the input content based on the metric. The input content is displayed on a display device at the adjusted frame rate.

Another embodiment provides a system comprising at least one processor and a non-transitory processor-readable memory device storing instructions that when executed by the at least one processor causes the at least one processor to perform operations. The operations include generating, via an edge detection algorithm, a first edge map based on a first frame of an input content comprising a sequence of frames. The operations further include generating, via the edge detection algorithm, a second edge map based on a second frame of the input content. The first frame precedes the second frame in the sequence of frames. The operations further include determining a difference between the first edge map and the second edge map, determining a metric indicative of an estimated amount of judder present in the input content based on the difference, and dynamically adjusting a frame rate of the input content based on the metric. The input content is displayed on a display device at the adjusted frame rate.

One embodiment provides a non-transitory processor-readable medium that includes a program that when executed by a processor performs a method comprising generating, via an edge detection algorithm, a first edge map based on a first frame of an input content comprising a sequence of frames. The method further comprises generating, via the edge detection algorithm, a second edge map based on a second frame of the input content. The first frame precedes the second frame in the sequence of frames. The method further comprises determining a difference between the first edge map and the second edge map, determining a metric indicative of an estimated amount of judder present in the input content based on the difference, and dynamically adjusting a frame rate of the input content based on the metric. The input content is displayed on a display device at the adjusted frame rate.

Some existing display devices, such as televisions, may provide frame rate conversion (FRC) solutions that match a frame rate of an input content (input content frame rate) to a frame rate of a display (display frame rate). For example, FRC is necessary if a display frame rate is much higher than an input content frame rate (e.g., 24 Hz vs. 120 Hz). Such solutions, however, result in an increase in judder. For example, some existing display devices have high brightness which makes judder more noticeable. In general, removal of judder in scenes capturing a sporting event, like football, is desirable as the removal enhances viewing experience by making it easier to follow movements captured in the scenes (e.g., ball movement and players' movements). Some conventional FRC solutions, however, remove all or most judder in a scene, resulting in object motion that appears too fluid and in turn creating a soap opera effect. The soap opera effect results when a conventional FRC solution interpolates effectively and removes most if not all judder in a scene.

The soap opera effect is often undesirable as the intent of a content creator is to preserve the original feeling of the scene. For example, the soap opera effect is undesirable when watching movies and conflicts with intent of movie makers as the movies are not being experienced in the way they intended. The soap opera effect removes the original "feel" of movies (i.e., movie theatre feel), resulting in a different movie watching experience than what the movie makers desire. Turning off an FRC solution to remove the soap opera effect, however, is not feasible for display with high luminance (brightness) as judder is too noticeable on such displays. Removing FRC for high luminance displays exacerbates the judder effect.

One or more embodiments provide a solution for frame rate conversion that removes just enough judder in a scene to avoid the soap opera effect, and simultaneously leave a certain amount of judder in the scene to preserve the intent of a content creator of the scene. In one embodiment, the solution implements more precise control logic of frame rate conversion, by detecting and measuring an amount of judder present in the scene, and dynamically adjusting frame rate based on the amount, all while maintaining the content creator's intent. In one embodiment, the solution removes unwanted judder while maintaining the original feel of content desired by a content creator, thereby improving viewing experience and overcoming a mismatch between intentions of the content creator and a manufacturer of a display on which the content is presented.

One or more embodiments provide a method and system of judder detection for dynamic frame rate conversion. In one embodiment, presence of judder in a scene is detected and measured based on differences in edges determined by applying edge detection to a sequence of frames. None of the existing conventional solutions for judder prediction/detection utilize edge detection. In one embodiment, a hierarchical multi-resolution approach is utilized to estimate/predict a judder level. In one embodiment, a frame rate of a portion of an input content is increased if an estimated/predicted judder level present in the portion exceeds a pre-determined threshold.

In one embodiment, edge detection comprises: (1) for each frame of a sequence of frames, creating an image containing only edges of the frame, (2) subtracting a current image containing only edges of a current frame of the sequence from a previous image containing only edges of a previous frame of the sequence, wherein the previous frame is a frame immediately preceding the current frame in the sequence, (3) predicting presence of judder in a scene using a metric (e.g. mean, summation, etc.), and (4) dynamically adjusting frame rate for FRC based on the metric. If the metric indicates that a predicted amount of judder present in the scene is high, the frame rate for FRC applied to the scene is increased; otherwise, if the metric indicates that the predicted amount of judder present in the scene is low, the frame rate for FRC applied to the scene is lowered. For example, the frame rate for FRC applied may be lowered such that there is still some judder present to avoid the soap opera effect.

One or more embodiments provide a method and system for frame rate mastering that preserves judder in a scene based on creative intent of a content creator of the scene. In one embodiment, an optimal frame rate table comprising values mapping one or more desired frame rates to one or more estimated/predicted amounts/degrees of judder is assigned, wherein each desired frame rate is proportional to an estimated/predicted amount/degree of judder the desired frame rate is mapped to. One or more experts, such as a content creator, can view content displayed on a mastering monitor, wherein FRC is applied to the content using the values of the optimal frame rate table. Based on expert feedback from the experts, a desired frame rate included in the optimal frame rate table is adjusted in accordance with a desired amount of judder that the experts intend to be present.

FIG. 1 illustrates an example computing architecture 100 for implementing judder detection for dynamic frame rate conversion, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a frame rate conversion system 200 configured to implement frame rate conversion of input content (e.g., a high dynamic range (HDR) video) for presentation on a display device (e.g., a HDR rendering display/device) 60 integrated in or coupled to the electronic device 110. In one embodiment, the frame rate conversion system 200 is configured to provide judder detection for dynamic frame rate conversion. The frame rate conversion system 200 is configured to receive input content (e.g., a HDR video) for presentation on the display device 60. One or more portions of the input content includes a sequence of frames (e.g., image/video frames, such as HDR frames). For example, if the input content is a HDR video, a portion of the HDR video comprises a sequence of frames capturing a scene.

For expository purposes, the term "judder level" as used in this specification generally refers to an amount or degree of judder.

As described in detail later herein, for each portion (e.g., scene) of the input content, the frame rate conversion system 200 is configured to: (1) receive information indicative of an estimated/predicted judder level present in at least one frame included in the portion of the input content, (2) dynamically determine an optimal frame rate for the at least one frame based on the estimated/predicted judder level, (3) adjust a frame rate utilized for frame rate conversion of the portion of the input content based on the optimal frame rate, (4) apply frame rate conversion to the portion of the input content to convert a frame rate of the portion of the input content from an original frame rate to the optimal frame rate, and (5) provide a converted portion resulting from the frame rate conversion to the display device 60, wherein the converted portion is displayed on the display device 60 at the optimal frame rate.

In one embodiment, metadata corresponding to the input content comprises per frame or scene information for the entire input content (e.g., an entire HDR video). For example, for each portion of the input content, the corresponding metadata comprises an estimated/predicted judder level present in at least one frame included in the portion of the input content, and a suggested/recommended frame rate for the at least one frame. As described in detail later herein, a suggested/recommended frame rate for a frame represents an optimal frame rate that factors into account an estimated/predicted judder level present in the frame and creative intent (e.g., creative intent of a content creator of the input content).

In another embodiment, for each portion of the input content, an estimated/predicted judder level present in at least one frame included in the portion of the input content is determined on-device (i.e., in-device, locally, or online). For example, in one embodiment, if metadata corresponding to the input content is not available, the frame rate conversion system 200 is configured to utilize edge detection to detect and estimate/predict, for each portion of the input content, a judder level present in at least one frame included in the portion of the input content.

Examples of an electronic device 110 include, but are not limited to, a television (e.g., a smart television), a mobile electronic device (e.g., an optimal frame rate tablet, a smart phone, a laptop, etc.), a wearable device (e.g., a smart watch, a smart band, a head-mounted display, smart glasses, etc.), a gaming console, a video camera, a media playback device (e.g., a Digital Video Disc (DVD) player), a set-top box, an Internet of things (IoT) device, a cable box, a satellite receiver, etc.

In one embodiment, the electronic device 110 comprises one or more sensor units 150 integrated in or coupled to the electronic device 110, such as a camera, a microphone, a Global Positioning System (GPS), a motion sensor, etc.

In one embodiment, the electronic device 110 comprises one or more I/O (input/output) units 140 integrated in or coupled to the electronic device 110. In one embodiment, the one or more I/O units 140 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 140 to configure one or more user preferences, configure one or more parameters, provide user input, etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 200.

In one embodiment, the electronic device 110 comprises a communications unit 160 configured to exchange data with the display device 60 (e.g., receiving one or more display characteristics of the display device 60, such as display frame rate). The communications unit 160 is further configured to exchange data with a remote computing environment, such as a remote computing environment 300 (e.g., receiving input content and/or metadata corresponding to the input content from the remote computing environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 300 includes resources, such as one or more servers 310 and one or more storage units 320. One or more applications 330 that provide higher-level services may execute/operate on the remote computing environment 300 utilizing the resources of the remote computing environment 300.

In one embodiment, the one or more applications 330 include a frame rate mastering system 400 (FIG. 2) configured to provide input content and, optionally, metadata corresponding to the input content.

In one embodiment, a remote computing environment 300 provides an online platform for hosting one or more online services (e.g., a video streaming service, etc.) and/or distributing one or more software mobile applications 170. For example, the frame rate conversion system 200 may be loaded onto or downloaded to the electronic device 110 from a remote computing environment 300 that maintains and distributes updates for the system 200. As another example, a remote computing environment 300 may comprise a cloud computing environment providing shared pools of configurable computing system resources and higher-level services.

Figure 2:
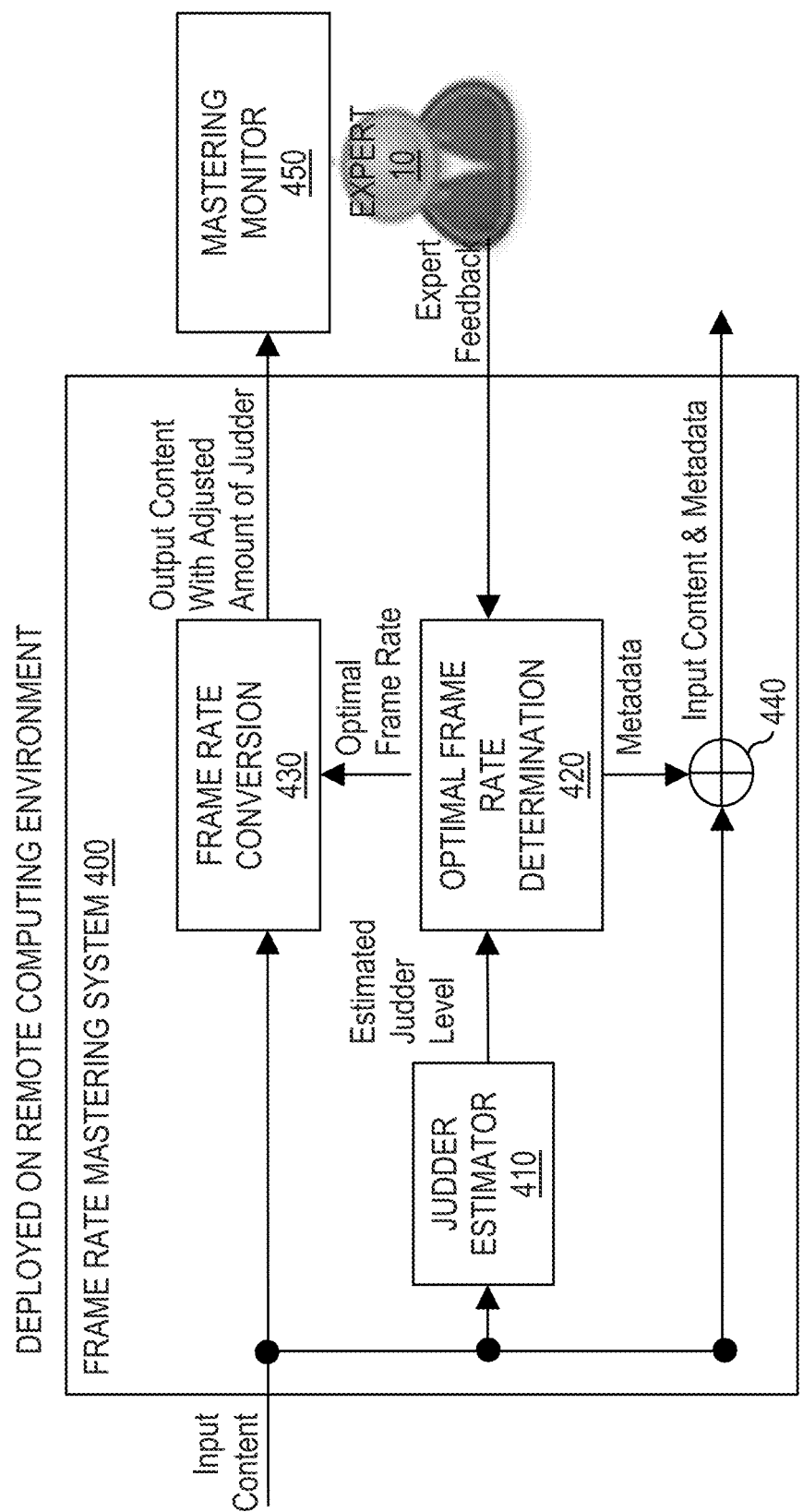
FIG. 2 illustrates an example frame rate mastering system for determining one or more optimal frame rates, in one or more embodiments.

FIG. 2 illustrates an example frame rate mastering system 400 for determining one or more optimal frame rates, in one or more embodiments. In one embodiment, a remote computing environment 300 represents a computing environment utilized for frame rate mastering at a studio. For example, in one embodiment, the one or more applications 330 deployed on the remote computing environment 300 comprise a frame rate mastering system 400 configured to perform off-device (i.e., offline) processing. In one embodiment, the off-device processing comprises: (1) receiving input content (e.g., a HDR video), and (2) in response to receiving the input content, initiating an evaluation process to determine, for each portion (e.g., scene) of the input content, an optimal frame rate for at least one frame included in the portion of the input content.

In one embodiment, as part of the evaluation process, for each portion of the input content, the system 400 is configured to: (1) estimate/predict a judder level present in at least one frame included in the portion of the input content, (2) determine an optimal frame rate for the at least one frame based on the estimated/predicted judder level, (3) apply dynamic frame rate conversion to the portion of the input content in accordance with the optimal frame rate, (4) provide a converted portion resulting from the dynamic frame rate conversion to a mastering monitor 450 for evaluation, (5) adjust the optimal frame rate based on expert feedback received during the evaluation, and (6) after the evaluation, optionally concatenate the input content with corresponding metadata indicative of the optimal frame rate.

In one embodiment, the mastering monitor 450 is a display device 60.

In one embodiment, the system 400 comprises a judder estimator system 410 configured to: (1) receive the input content, and (2) perform judder detection on the input content. In one embodiment, the judder estimator system 410 performs judder detection by estimating/predicting, for each portion of the input content, a judder level present in at least one frame included in the portion of the input content utilizing edge detection.

In one embodiment, the system 400 comprises an optimal frame rate determination unit 420 configured to: (1) initialize/set, at the start of the evaluation process, one or more values of an expert preferences table, and (2) adjust one or more values of the expert preferences table in response to expert feedback received during the evaluation process.

In one embodiment, the expert preferences table is a look-up table comprising one or more pairs of values, wherein each pair of values maps a particular judder level to an optimal frame rate corresponding to the judder level. In one embodiment, the optimal frame rate determination unit 420 initializes/sets all optimal frame rates of the expert preferences table to pre-determined initial values. In one embodiment, each optimal frame rate of the expert preferences table is initialized/set to a pre-determined initial value that is proportional to a corresponding judder level (i.e., a judder level that the optimal frame rate is mapped to). In one embodiment, the optimal frame rate determination unit 420 adjusts at least one optimal frame rate of the expert preferences table in response to expert feedback received during the evaluation process.

In one embodiment, the expert preferences table is maintained on a database (e.g., on one or more storage units 320).

In one embodiment, for each portion of the input content, the optimal frame rate determination unit 420 is configured to: (1) receive an estimated/predicted judder level present in at least one frame included in the portion of the input content (e.g., from the judder estimator system 410), and (2) select an optimal frame rate for the at least one frame from the expert preferences table, wherein the selected optimal frame rate is an optimal frame rate that the estimated/predicted judder level is mapped to.

In one embodiment, the system 400 comprises a frame rate conversion unit 430 configured to: (1) receive the input content, and (2) apply dynamic frame rate conversion to the input content in accordance with one or more optimal frame rates of the expert preferences table, resulting in output content comprising one or more converted portions. Specifically, the frame rate conversion unit 430 is configured to: (1) for each portion of the input content, receive an optimal frame rate for at least one frame included in the portion of the input content (e.g., from the optimal frame rate determination unit 420), and (2) adaptively change a frame rate for the portion of the input content based on the optimal frame rate, resulting in a corresponding converted portion with an adjusted amount/degree of judder present in at least one frame included in the converted portion.

For each portion of the input content, an amount/degree of judder present in at least one frame included in the portion of the input content is different than an amount/degree of judder present in at least one frame included in a corresponding converted portion. For example, a converted portion of the output content may have less judder than a corresponding portion of input content (i.e., judder is reduced); not all judder, however, is removed from the output content, thereby preventing the soap opera effect. The output content includes some amount/degree of judder to preserve/maintain creative intent (e.g., creative intent of a content creator of the input content).

In one embodiment, the system 400 dynamically adjusts, via the optimal frame rate determination unit 420 and the frame rate conversion unit 430, a frame rate for a portion of the input content by triggering an increase in the frame rate if an estimated/predicted judder level present in at least one frame included in the portion of the input content exceeds a pre-determined threshold (e.g., an optimal frame rate for the at least one frame is higher than an original frame rate). In one embodiment, the system 400 dynamically adjusts, via the optimal frame rate determination unit 420 and the frame rate conversion unit 430, a frame rate for a portion of the input content by stopping an increase in the frame rate if an estimated/predicted judder level present in at least one frame included in the portion of the input content does not exceed the pre-determined threshold (e.g., an optimal frame rate for the at least one frame is the same as an original frame rate).

In one embodiment, the system 400 provides, via the frame rate conversion unit 430, the output content to a mastering monitor 450 for evaluation by one or more experts 10. Examples of experts 10 include, but are not limited to, content creators. Each expert 10 can view the output content, and provide expert feedback representing one or more expert preferences of the expert 10 (i.e., personal preferences of the expert 10). For example, in one embodiment, expert feedback is indicative of whether to increase or decrease an amount/degree of judder present in at least one frame of the input content. Expert feedback reflects desired creative intent (e.g., creative intent of a content creator of the input content). In one embodiment, an expert 10 utilizes at least one I/O unit 140 of an electronic device 110 to provide expert feedback.

In one embodiment, the optimal frame rate determination unit 420 is configured to: (1) receive expert feedback from at least one expert 10, and (2) perform one or more adjustments/refinements on the expert preferences table based on the expert feedback received, wherein each adjustment/refinement comprises adjusting/changing an optimal frame rate of the expert preferences table. For example, if the expert feedback received is indicative of an expert preference to decrease an amount/degree of judder present in at least one frame of the input content, at least one optimal frame rate of the expert preferences table is increased. As another example, if the expert feedback received is indicative of an expert preference to increase an amount/degree of judder present in at least one frame of the input content, at least one optimal frame rate of the expert preferences table is decreased.

The system 400 allows an expert 10 to override an optimal frame rate of the expert preferences table that was initialized/set to a pre-determined initial value with a new optimal frame rate that factors into account a personal preference of the expert 10 (e.g., a higher optimal frame rate to reduce an amount/degree of judder present). By including some amount/degree of judder in the output content in accordance with expert feedback received, the system 400 preserves/maintains desired creative intent (e.g., creative intent of a content creator of the input content).

In one embodiment, the evaluation process is performed iteratively until there is no more expert feedback from the experts 10 (i.e., the experts 10 are satisfied with the output content displayed on the mastering monitor 450). Values of the expert preferences table are finalized if there are no more adjustments/refinements to perform on the table.

In one embodiment, the system 400 comprises an optional concatenation unit 440 configured to: (1) receive the input content, and (2) concatenate the input content with corresponding metadata comprising one or more finalized values of the expert preferences table. In one embodiment, for each frame of the input content, the corresponding metadata comprises: an estimated/predicted judder level present in the frame (e.g., determined via the judder estimator system 410), and a corresponding suggested/recommended frame rate representing an optimal frame rate that the estimated/predicted judder level is mapped to in the expert preferences table.

In one embodiment, the system 400 provides the frame rate conversion system 200 with the input content only, via the network 50. In one embodiment, the system 400 provides the frame rate conversion system 200 with the input content concatenated with the corresponding metadata, via the network 50.

Figure 3:
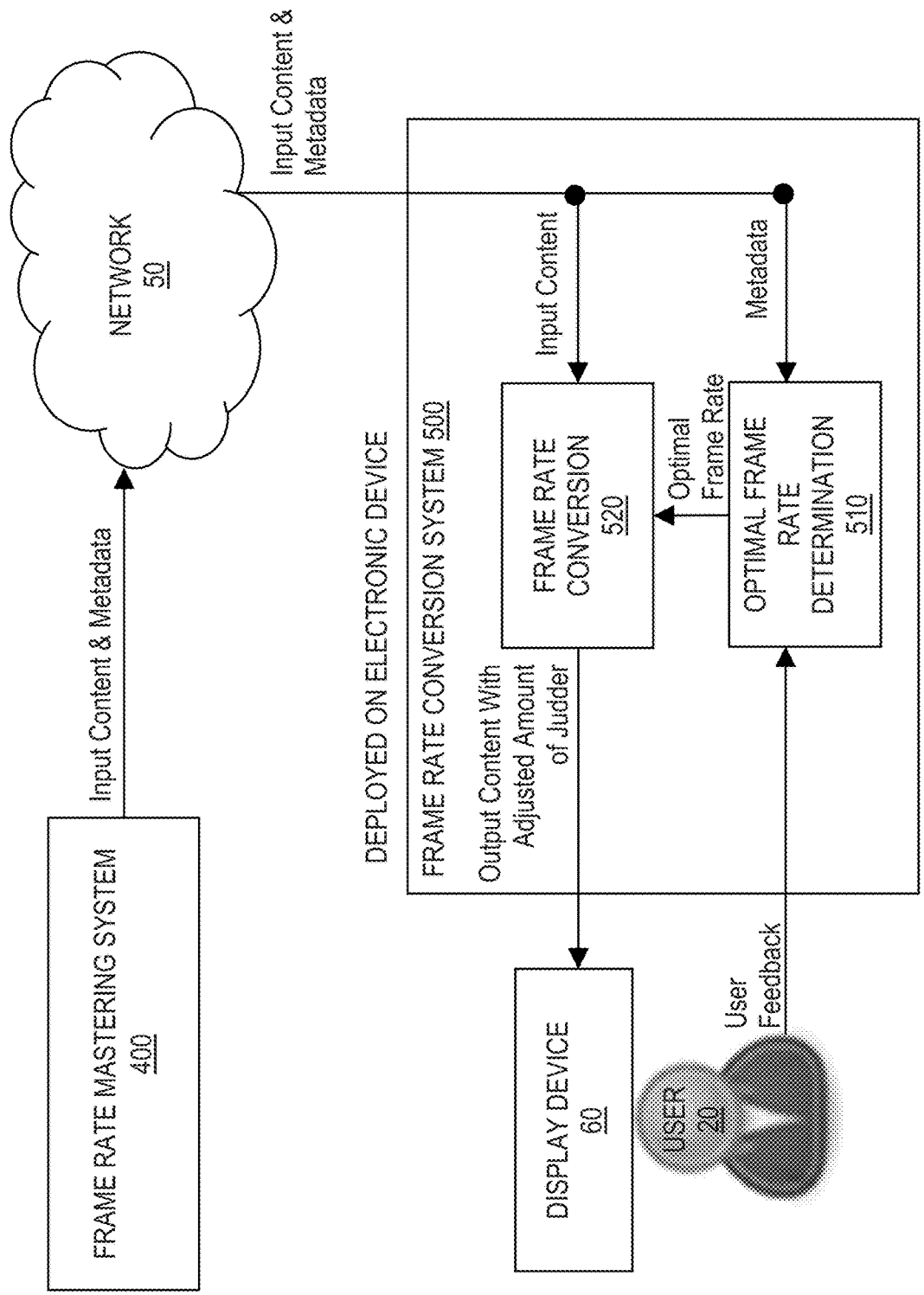
FIG. 3 illustrates an example frame rate conversion system for dynamic frame rate conversion, in one or more embodiments.

FIG. 3 illustrates an example frame rate conversion system 500 for dynamic frame rate conversion, in one or more embodiments. In one embodiment, the frame rate conversion system 200 in FIG. 1 is implemented as the frame rate conversion system 500 configured to perform on-device (i.e., online) processing. In one embodiment, the on-device processing comprises: (1) receiving input content (e.g., a HDR video) and metadata corresponding to the input content (e.g., from the frame rate mastering system 400, via the network 50), and (2) applying dynamic frame rate conversion to the input content in accordance with the corresponding metadata. The system 500 dynamically adjusts a frame rate for a portion of the input content (e.g., a portion of the HDR video capturing a scene) based on a metric indicative of an estimated/predicted judder level present in at least one frame included in the portion of the input content, such that the portion of the input content is displayed on a display device 60 at the adjusted frame rate.

In one embodiment, the system 500 comprises an optimal frame rate determination unit 510 configured to: (1) receive the corresponding metadata, (2) initialize/set one or more values of a user preferences table based on the corresponding metadata, and (3) adjust one or more values of the user preferences table in response to user feedback received. In one embodiment, the user preferences table is a look-up table comprising one or more pairs of values, wherein each pair of values maps a particular judder level to an optimal frame rate corresponding to the judder level. In one embodiment, the optimal frame rate determination unit 510 initializes/sets one or more optimal frame rates of the user preferences table to one or more suggested/recommended frame rates included in the corresponding metadata. In one embodiment, the optimal frame rate determination unit 510 adjusts at least one optimal frame rate of the user preferences table in response to user feedback received.

In one embodiment, the user preferences table is maintained on a database (e.g., on one or more storage units 130).

In one embodiment, for each portion of the input content, the optimal frame rate determination unit 510 is configured to: (1) determine an estimated/predicted judder level present in at least one frame included in the portion of the input content based on the corresponding metadata, and (2) select an optimal frame rate for the at least one frame from the user preferences table, wherein the selected optimal frame rate is an optimal frame rate that the estimated/predicted judder level is mapped to. Prior to receiving user feedback, the selected optimal frame rate is a corresponding suggested/recommended frame rate included in the corresponding metadata (i.e., the user preferences table is initialized/set based on the corresponding metadata).

In one embodiment, the system 500 comprises a frame rate conversion unit 520 configured to: (1) receive the input content, and (2) apply dynamic frame rate conversion to the input content in accordance with one or more optimal frame rates of the user preferences table, resulting in output content comprising one or more converted portions. Specifically, the frame rate conversion unit 520 is configured to: (1) for each portion of the input content, receive an optimal frame rate for at least one frame included in the portion of the input content (e.g., from the optimal frame rate determination unit 510), and (2) adaptively change a frame rate for the portion of the input content based on the optimal frame rate, resulting in a corresponding converted portion with an adjusted amount/degree of judder present in at least one frame included in the converted portion.

For each portion of the input content, an amount/degree of judder present in at least one frame included in the portion of the input content is different than an amount/degree of judder present in at least one frame included in a corresponding converted portion. For example, a converted portion of the output content may have less judder than a corresponding portion of input content (i.e., judder is reduced); not all judder, however, is removed from the output content, thereby preventing the soap opera effect. The output content includes some amount/degree of judder to preserve/maintain creative intent (e.g., creative intent of a content creator of the input content).

In one embodiment, the system 500 dynamically adjusts, via the optimal frame rate determination unit 510 and the frame rate conversion unit 520, a frame rate for a portion of the input content by triggering an increase in the frame rate if an estimated/predicted judder level present in at least one frame included in the portion of the input content exceeds a pre-determined threshold (e.g., an optimal frame rate for the at least one frame is higher than an original frame rate). In one embodiment, the system 500 dynamically adjusts, via the optimal frame rate determination unit 510 and the frame rate conversion unit 520, a frame rate for a portion of the input content by stopping an increase in the frame rate if an estimated/predicted judder level present in at least one frame included in the portion of the input content does not exceed the pre-determined threshold (e.g., an optimal frame rate for the at least one frame is the same as an original frame rate).

In one embodiment, the system 500 provides, via the frame rate conversion unit 520, the output content to a display device 60 for presentation to one or more users 20. Each user 20 can view the output content displayed on the display device 60, and provide user feedback representing one or more user preferences of the user 20 (i.e., personal preferences of the user 20). For example, in one embodiment, user feedback is indicative of whether to increase or decrease an amount/degree of judder present in at least one frame of the input content. In one embodiment, a user 20 can utilize at least one I/O unit 140 of an electronic device 110 to provide user feedback.

In one embodiment, the optimal frame rate determination unit 510 is configured to: (1) receive user feedback from at least one user 20, and (2) perform one or more adjustments/refinements on the user preferences table based on the user feedback received, wherein each adjustment/refinement comprises adjusting/changing an optimal frame rate of the user preferences table. For example, if the user feedback received is indicative of a user preference to decrease an amount/degree of judder present in at least one frame of the input content, at least one optimal frame rate of the user preferences table is increased. As another example, if the user feedback received is indicative of a user preference to increase an amount/degree of judder present in at least one frame of the input content, at least one optimal frame rate of the user preferences table is decreased.

Figure 4:
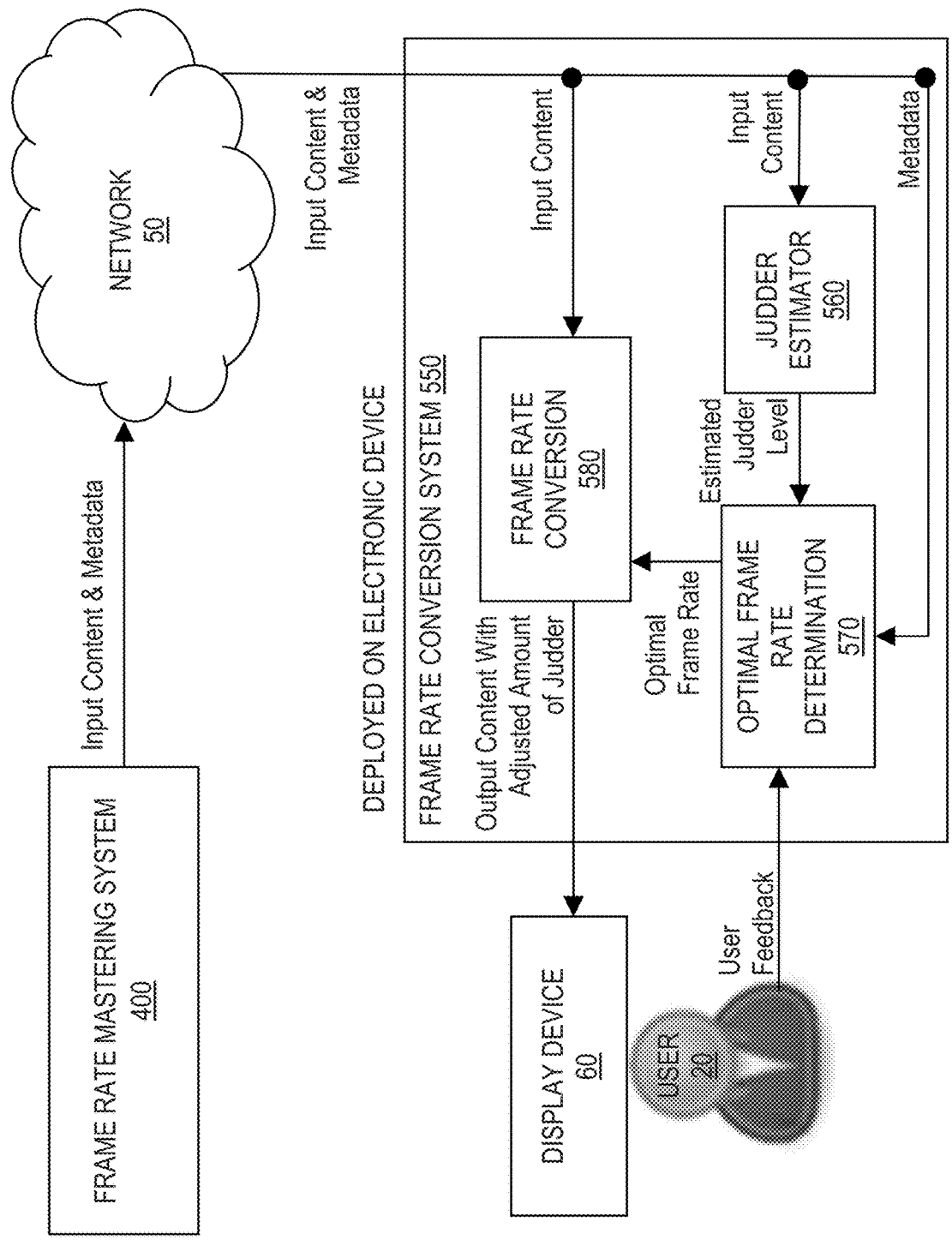
FIG. 4 illustrates another example frame rate conversion system for dynamic frame rate conversion, in one or more embodiments.

FIG. 4 illustrates another example frame rate conversion system 550 for dynamic frame rate conversion, in one or more embodiments. In one embodiment, the frame rate conversion system 200 in FIG. 1 is implemented as the frame rate conversion system 550 configured to perform on-device (i.e., online) processing. Input content may not have corresponding metadata. For example, input content may not be concatenated with corresponding metadata. In one embodiment, the on-device processing comprises: (1) receiving input content (e.g., a HDR video) (e.g., from the frame rate mastering system 400, via the network 50), (2) if available, receiving metadata corresponding to the input content (e.g., from the frame rate mastering system 400, via the network 50), (3) if the corresponding metadata is not available, estimating/predicting, for each portion of the input content, a judder level present in at least one frame included in the portion of the input content, and (4) applying dynamic frame rate conversion to the input content in accordance with either each estimated/predicted judder level or, if available, the corresponding metadata.

In one embodiment, the system 550 comprises a judder estimator system 560 configured to: (1) receive the input content, and (2) if the corresponding metadata is not available, perform judder detection on the input content. In one embodiment, the judder estimator system 560 performs judder detection by estimating/predicting, for each portion of the input content, a judder level present in at least one frame included in the portion of the input content utilizing edge detection.

In one embodiment, if the corresponding metadata is available, the system 550 bypasses performing judder detection.

In one embodiment, the system 550 comprises an optimal frame rate determination unit 570 configured to: (1) if the corresponding metadata is available, receive the corresponding metadata, (2) if the corresponding metadata is not available, receive, for each portion of the input content, an estimated/predicted judder level present in at least one frame included in the portion of the input content (e.g., from the judder estimator system 560), (3) initialize/set one or more values of a user preferences table based on either each estimated/predicted judder level received or, if available, at least one suggested/recommended frame rate included in the corresponding metadata, and (4) adjust one or more values of the user preferences table in response to user feedback received.

In one embodiment, the user preferences table is a look-up table comprising one or more pairs of values, wherein each pair of values maps a particular judder level to an optimal frame rate corresponding to the judder level. In one embodiment, if the corresponding metadata is available, the optimal frame rate determination unit 570 initializes/sets one or more optimal frame rates of the user preferences table to one or more suggested/recommended frame rates included in the corresponding metadata. In one embodiment, if the corresponding metadata is not available, the optimal frame rate determination unit 570 initializes/sets all optimal frame rates of the user preferences table to pre-determined initial values. For example, in one embodiment, if the corresponding metadata is not available, each optimal frame rate of the user preferences table is initialized/set to a pre-determined initial value that is proportional to a corresponding judder level (i.e., a judder level that the optimal frame rate is mapped to). In another embodiment, if the corresponding metadata is not available, an expert preferences table comprising optimal frame rates for the input content is downloaded from a remote computing environment 300 (e.g., the frame rate mastering system 400) to the system 550 for use as the user preferences table (i.e., the user preferences table in the system 550 is a duplicate of the expert preferences table in the system 400). In one embodiment, the optimal frame rate determination unit 570 adjusts at least one optimal frame rate of the user preferences table in response to user feedback received.

In one embodiment, the user preferences table is maintained on a database (e.g., on one or more storage units 130).

In one embodiment, for each portion of the input content, the optimal frame rate determination unit 570 is configured to: (1) obtain an estimated/predicted judder level present in at least one frame included in the portion of the input content, and (2) select an optimal frame rate for the at least one frame from the user preferences table, wherein the selected optimal frame rate is an optimal frame rate that the estimated/predicted judder level is mapped to. If the corresponding metadata is available, the estimated/predicted judder level is obtained from the corresponding metadata. If the corresponding metadata is not available, the estimated/predicted judder level is obtained from the judder estimator system 560. Prior to receiving user feedback, the selected optimal frame rate is either a pre-determined initial value (i.e., the user preferences table is initialized/set based on the pre-determined initial values) or, if available, a suggested/recommended frame rate included in the corresponding metadata (i.e., the user preferences table is initialized/set based on the corresponding metadata).

In one embodiment, the system 550 comprises a frame rate conversion unit 580 configured to: (1) receive the input content, and (2) apply dynamic frame rate conversion to the input content in accordance with one or more optimal frame rates of the user preferences table, resulting in output content comprising one or more converted portions. Specifically, the frame rate conversion unit 580 is configured to: (1) for each portion of the input content, receive an optimal frame rate for at least one frame included in the portion of the input content (e.g., from the optimal frame rate determination unit 570), and (2) adaptively change a frame rate for the portion of the input content based on the optimal frame rate, resulting in a corresponding converted portion with an adjusted amount/degree of judder present in at least one frame included in the converted portion.

For each portion of the input content, an amount/degree of judder present in at least one frame included in the portion of the input content is different than an amount/degree of judder present in at least one frame included in a corresponding converted portion. For example, a converted portion of the output content may have less judder than a corresponding portion of input content (i.e., judder is reduced); not all judder, however, is removed from the output content, thereby preventing the soap opera effect. The output content includes some amount/degree of judder to preserve/maintain creative intent (e.g., creative intent of a content creator of the input content).

In one embodiment, the system 550 dynamically adjusts, via the optimal frame rate determination unit 570 and the frame rate conversion unit 580, a frame rate for a portion of the input content by triggering an increase in the frame rate if an estimated/predicted judder level present in at least one frame included in the portion of the input content exceeds a pre-determined threshold (e.g., an optimal frame rate for the at least one frame is higher than an original frame rate). In one embodiment, the system 550 dynamically adjusts, via the optimal frame rate determination unit 570 and the frame rate conversion unit 580, a frame rate for a portion of the input content by stopping an increase in the frame rate if an estimated/predicted judder level present in at least one frame included in the portion of the input content does not exceed the pre-determined threshold (e.g., an optimal frame rate for the at least one frame is the same as an original frame rate).

In one embodiment, the system 550 provides, via the frame rate conversion unit 580, the output content to a display device 60 for presentation to one or more users 20. Each user 20 can view the output content, and provide user feedback representing one or more user preferences of the user 20 (i.e., personal preferences of the user 20). For example, in one embodiment, user feedback is indicative of whether to increase or decrease an amount/degree of judder present in at least one frame of the input content. In one embodiment, a user 10 utilizes at least one I/O unit 140 of an electronic device 110 to provide user feedback.

In one embodiment, the optimal frame rate determination unit 570 is configured to: (1) receive user feedback from at least one user 20, and (2) perform one or more adjustments/refinements on the user preferences table based on the user feedback received, wherein each adjustment/refinement comprises adjusting/changing an optimal frame rate of the user preferences table. For example, if the user feedback received is indicative of a user preference to decrease an amount/degree of judder present in at least one frame of the input content, at least one optimal frame rate of the user preferences table is increased. As another example, if the user feedback received is indicative of a user preference to increase an amount/degree of judder present in at least one frame of the input content, at least one optimal frame rate of the user preferences table is decreased.

Each of the systems 500, 550 allows a user 20 to override an optimal frame rate of the user preferences table that was initialized/set to a suggested/recommended frame rate included in the corresponding metadata with a new optimal frame rate that factors into account a personal preference of the user 20 (e.g., a higher optimal frame rate to reduce an amount/degree of judder present).

Each of the systems 500, 550 preserves/maintains a certain amount of judder during presentation of an input content, in accordance with creative intent (e.g., creative intent of a content creator of the input content). Further, each of the systems 500, 550 requires a small or minimum amount of processing to determine an amount of judder to preserve/maintain.

Figure 5:
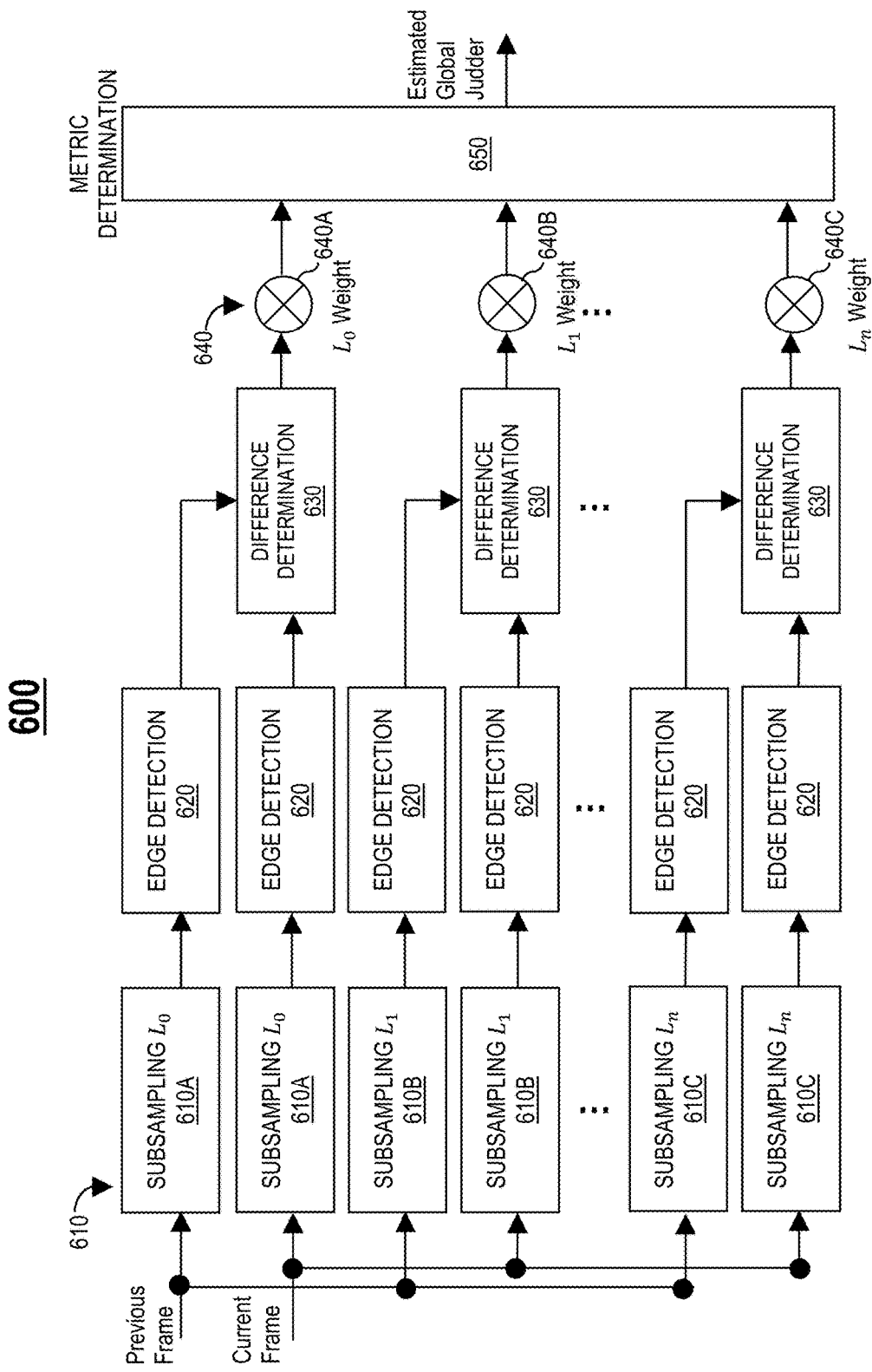
FIG. 5 illustrates an example judder estimator system for judder detection, in one or more embodiments.

FIG. 5 illustrates an example judder estimator system 600 for judder detection, in one or more embodiments. In one embodiment, the judder estimator system 410 in FIG. 2 and/or the judder estimator system 560 in FIG. 4 is implemented as the judder estimator system 600. In one embodiment, the judder estimator system 600 comprises a plurality of subsampling units 610. The plurality of subsampling units 610 generate a first set of subsampled images of different resolutions based on a previous frame of an input content, and further generate a second set of subsampled images of the different resolutions based on a current frame of the input content. A previous frame is a frame that precedes (e.g., temporally precedes) a current frame in a sequence of frames that forms a portion of the input content (e.g., a portion of a video, such as a scene captured in the video).

Specifically, each subsampling unit 610 corresponds to a particular resolution $L_i$, wherein $i \in [0, n]$, and n is a positive integer. In one embodiment, $L_0$ is a resolution that is equal to resolution of a frame of an input content, $L_1$ is a resolution that is smaller than $L_0$, $L_2$ is a resolution that is smaller than $L_1$, $L_3$ is a resolution that is smaller than $L_2$, . . . , and $L_n$ is a resolution that is smaller than $L_{n-1}$. Of the different resolutions, $L_1$ is the highest resolution, and $L_n$ is the smallest resolution.

In one embodiment, a subsampling unit 610 corresponding to resolution $L_i$ is configured to: (1) receive a frame of the input content, and (2) generate a corresponding subsampled image of resolution $L_i$ by sampling the frame at resolution $L_i$.

In one embodiment, the plurality of sub sampling units 610 comprises, for each resolution $L_i$, a pair of subsampling units 610 corresponding to resolution $L_i$. A pair of subsampling units 610 corresponding to resolution $L_i$ includes: (1) a first subsampling unit 610 configured to generate a first subsampled image of resolution $L_i$ by sampling a previous frame at resolution $L_i$, and (2) a second subsampling unit 610 configured to generate a second subsampled image of resolution $L_i$ by sampling a current frame at resolution $L_i$. In one embodiment, if a current frame is a first frame in a sequence of frames, the system 600 bypasses sampling a previous frame as there is no previous frame available.

For example, in one embodiment, the plurality of subsampling units 610 includes a first pair of subsampling units 610A for generating subsampled images of resolution $L_0$, a second pair of subsampling units 610B for generating subsampled images of resolution $L_1$, . . . , and an $n^{th}$ pair of subsampling units 610C for generating subsampled images of resolution $L_n$.

In one embodiment, the system 600 comprises a plurality of edge detection units 620. The plurality of edge detection units 620 generate a first set of edge maps based on the first set of subsampled images, and further generate a second set of edge maps based on the second set of subsampled images.

Specifically, each of the plurality of subsampling units 610 has a corresponding edge detection unit 620 included in the plurality of edge detection units 620. In one embodiment, an edge detection unit 620 is configured to: (1) receive a subsampled image from a corresponding subsampling unit 610, and (2) extract an edge map from the subsampled image by applying one or more edge detection algorithms to the subsampled image.

For example, in one embodiment, the plurality of edge detection units 620 includes a first pair of edge detection units 620 for extracting edge maps from subsampled images of resolution $L_0$ from the first pair of subsampling units 610A, a second pair of edge detection units 620 for extracting edge maps from subsampled images of resolution $L_1$ from the second pair of subsampling units 610B, . . . , and an $n^{th}$ pair of edge detection units 620 for extracting edge maps from subsampled images of resolution $L_n$ from the $n^{th}$ pair of subsampling units 610C.

In one embodiment, the system 600 comprises a plurality of difference determination units 630. The plurality of difference determination units 630 determine a set of differences between the first set of edge maps and the second set of edge maps.

Specifically, each pair of edge detection units 620 has a corresponding difference determination unit 630 included in the plurality of difference determination units 630. In one embodiment, a difference determination unit 630 is configured to: (1) receive a first edge map from a first edge detection unit 620 of a corresponding pair of edge detection units 620, wherein the first edge map is extracted from a subsampled image corresponding to a previous frame, (2) receive a second edge map from a second edge detection unit 620 of the corresponding pair of edge detection units 620, wherein the second edge map is extracted from a subsampled image corresponding to a current frame, and (3) determine a difference between the first edge map and the second edge map. In one embodiment, the difference comprises an absolute difference between the first edge map and the second edge map (e.g., determined by subtracting the second edge map from the first edge map).

For example, in one embodiment, the plurality of difference determination units 630 includes a first difference determination unit 630 for determining a first difference between edge maps from the first pair of edge detection units 620, a second difference determination unit 630 for determining a second difference between edge maps from the second pair of edge detection units 620, . . . , and an $n^{th}$ difference determination unit 630 for determining an $n^{th}$ difference between edge maps from the $n^{th}$ pair of edge detection units 620.

In one embodiment, the system 600 comprises a plurality of multiplier units 640. Each multiplier unit 640 corresponds to a particular resolution $L_i$. Each difference determination unit 630 has a corresponding multiplier unit 640 included in the plurality of multiplier units 640. In one embodiment, a multiplier unit 630 is configured to: (1) receive a difference from a corresponding difference determination unit 630, wherein the difference is between edge maps extracted from subsampled images of a corresponding resolution $L_i$, and (2) determine a weighted difference by multiplying the difference by a weight corresponding to resolution $L_i$.

For example, in one embodiment, the plurality of multiplier units 640 includes a first multiplier unit 640A for multiplying the first difference from the first difference determination unit 630 by a first weight corresponding to resolution $L_0$, a second multiplier unit 640B for multiplying the second difference from the second difference determination unit 630 by a second weight corresponding to resolution $L_1$, . . . , and an $n^{th}$ multiplier unit 640C for multiplying the $n^{th}$ difference from the $n^{th}$ difference determination unit 630 by an $n^{th}$ weight corresponding to resolution $L_n$.

In one embodiment, the system 600 comprises a metric determination unit 650. The metric determination unit 650 determines a metric based on the set of differences and a set of weights corresponding to the different resolutions. Specifically, the metric determination unit 650 is configured to: (1) receive, from each of the plurality of multiplier units 640, a weighted difference, and (2) determine a metric representing an estimated/predicted amount of global judder ("estimated global judder") present in a current frame based on all weighted differences received. In one embodiment, the metric is a sum of all the weighted differences received (e.g., a sum of weighted absolute differences between edge maps across all the different resolutions $L_0$, $L_1$, . . . , and $L_n$). In another embodiment, the metric is a mean of all the weighted differences received.

In one embodiment, the system 600 outputs, via the metric determination unit 650, a metric representing an estimated global judder as an estimated/predicted judder level present in a current frame.

Figure 6:
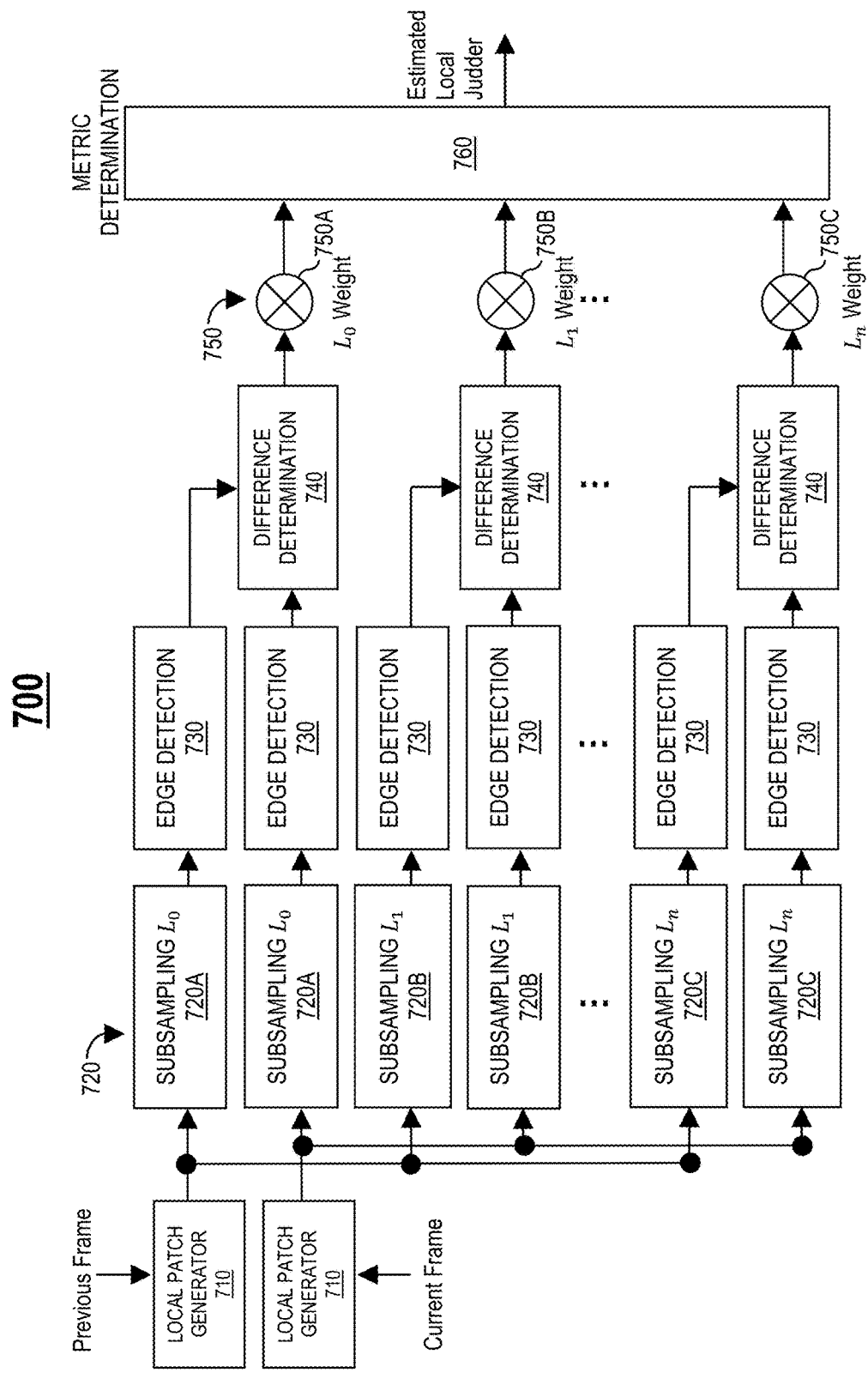
FIG. 6 illustrates an example judder estimator system for judder detection, in one or more embodiments.

FIG. 6 illustrates an example judder estimator system 700 for judder detection, in one or more embodiments. In one embodiment, the judder estimator system 410 in FIG. 2 and/or the judder estimator system 560 in FIG. 4 is implemented as the judder estimator system 700. In one embodiment, the judder estimator system 700 comprises a plurality of local patch generator units 710. A local patch generator unit 710 is configured to: (1) receive a frame of an input content, and (2) generate a local patch image corresponding to the frame by cropping the local patch image from the frame. A local patch image corresponding to a frame is smaller than the frame.

For example, in one embodiment, the plurality of local patch generator units 710 includes a first local patch generator unit 710 for generating a first local patch image corresponding to a previous frame of the input content, and a second local patch generator unit 710 for generating a second local patch image corresponding to a current frame of the input content. In one embodiment, if a current frame is a first frame in a sequence of frames, the system 700 bypasses generating a local patch image corresponding to a previous frame as there is no previous frame available.

In one embodiment, the system 700 comprises a plurality of subsampling units 720. The plurality of sub sampling units 720 generate a first set of subsampled images of different resolutions based on a previous frame, and further generate a second set of subsampled images of the different resolutions based on a current frame.

Specifically, each subsampling unit 720 corresponds to a particular resolution $L_i$. In one embodiment, a subsampling unit 720 corresponding to resolution $L_i$ is configured to: (1) receive a local patch image corresponding to a frame of the input content, and (2) generate a corresponding subsampled image of resolution $L_i$ by sampling the local patch image at resolution $L_i$.

In one embodiment, the plurality of sub sampling units 720 comprises, for each resolution $L_i$, a pair of subsampling units 720 corresponding to resolution $L_i$. A pair of subsampling units 720 corresponding to resolution $L_i$ includes: (1) a first subsampling unit 720 configured to generate a first subsampled image of resolution $L_i$ by sampling a first local patch image corresponding to a previous frame, and (2) a second subsampling unit 720 configured to generate a second subsampled image of resolution $L_i$ by sampling a second local patch image corresponding to a current frame.

For example, in one embodiment, the plurality of subsampling units 720 includes a first pair of subsampling units 720A for generating subsampled images of resolution $L_0$, a second pair of subsampling units 720B for generating subsampled images of resolution $L_1$, . . . , and an $n^{th}$ pair of subsampling units 720C for generating subsampled images of resolution $L_n$.

In one embodiment, the system 700 comprises a plurality of edge detection units 730. The plurality of edge detection units 730 generate a first set of edge maps based on the first set of subsampled images, and further generate a second set of edge maps based on the second set of subsampled images.

Specifically, each of the plurality of subsampling units 720 has a corresponding edge detection unit 730 included in the plurality of edge detection units 730. In one embodiment, an edge detection unit 730 is configured to: (1) receive a subsampled image from a corresponding subsampling unit 720, and (2) extract an edge map from the subsampled image by applying one or more edge detection algorithms to the subsampled image.

For example, in one embodiment, the plurality of edge detection units 730 includes a first pair of edge detection units 730 for extracting edge maps from subsampled images of resolution $L_0$ from the first pair of subsampling units 720A, a second pair of edge detection units 730 for extracting edge maps from subsampled images of resolution $L_1$ from the second pair of subsampling units 720B, . . . , and an $n^{th}$ pair of edge detection units 730 for extracting edge maps from subsampled images of resolution $L_n$ from the $n^{th}$ pair of subsampling units 720C.

In one embodiment, the system 700 comprises a plurality of difference determination units 740. The plurality of difference determination units 740 determine a set of differences between the first set of edge maps and the second set of edge maps.

Specifically, each pair of edge detection units 730 has a corresponding difference determination unit 740 included in the plurality of difference determination units 740. In one embodiment, a difference determination unit 740 is configured to: (1) receive a first edge map from a first edge detection unit 730 of a corresponding pair of edge detection units 730, wherein the first edge map is extracted from a first subsampled image corresponding to a first local patch image that in turn corresponds to a previous frame, (2) receive a second edge map from a second edge detection unit 730 of the corresponding pair of edge detection units 730, wherein the second edge map is extracted from a second subsampled image corresponding to a second local patch image that in turn corresponds to a current frame, and (3) determine a difference between the first edge map and the second edge map. In one embodiment, the difference comprises an absolute difference between the first edge map and the second edge map (e.g., determined by subtracting the second edge map from the first edge map).

For example, in one embodiment, the plurality of difference determination units 740 includes a first difference determination unit 740 for determining a first difference between edge maps from the first pair of edge detection units 730, a second difference determination unit 740 for determining a second difference between edge maps from the second pair of edge detection units 730, . . . , and an $n^{th}$ difference determination unit 740 for determining an $n^{th}$ difference between edge maps from the $n^{th}$ pair of edge detection units 730.

In one embodiment, the system 700 comprises a plurality of multiplier units 750. Each multiplier unit 750 corresponds to a particular resolution $L_i$. Each difference determination unit 740 has a corresponding multiplier unit 750 included in the plurality of multiplier units 750. In one embodiment, a multiplier unit 740 is configured to: (1) receive a difference from a corresponding difference determination unit 740, wherein the difference is between edge maps extracted from subsampled images of a corresponding resolution $L_i$, and (2) determine a weighted difference by multiplying the difference by a weight corresponding to resolution $L_i$.

For example, in one embodiment, the plurality of multiplier units 750 includes a first multiplier unit 750A for multiplying the first difference from the first difference determination unit 740 by a first weight corresponding to resolution $L_0$, a second multiplier unit 750B for multiplying the second difference from the second difference determination unit 740 by a second weight corresponding to resolution $L_1$, . . . , and an $n^{th}$ multiplier unit 750C for multiplying the $n^{th}$ difference from the $n^{th}$ difference determination unit 740 by an $n^{th}$ weight corresponding to resolution $L_n$.

In one embodiment, the system 700 comprises a metric determination unit 760. The metric determination unit 760 determines a metric based on the set of differences and a set of weights corresponding to the different resolutions. Specifically, the metric determination unit 760 is configured to: (1) receive, from each of the plurality of multiplier units 750, a weighted difference, and (2) determine a metric representing an estimated/predicted amount of local judder ("estimated local judder") present in a local patch image corresponding to a current frame based on all weighted differences received. In one embodiment, the metric is a sum of all the weighted differences received (e.g., a sum of weighted absolute differences between edge maps across all the different resolutions $L_0$, $L_1$, . . . , and $L_n$). In another embodiment, the metric is a mean of all the weighted differences received.

In one embodiment, the system 700 partitions, via the local patch generators 710, a current frame into a plurality of local patch images, iteratively determines an estimated local judder present in each of the plurality of local patch images, and outputs, via the metric determination unit 760, a sum of each estimated local judder as an estimated/predicted judder level present in the current frame.

Each of the systems 600, 700 provide a hierarchical multi-resolution approach involving generating subsampled images of different resolutions, and estimating/predicting, based on the sub sampled images, a judder level present in a frame of an input content or a local patch image cropped from the frame.

Figure 7:
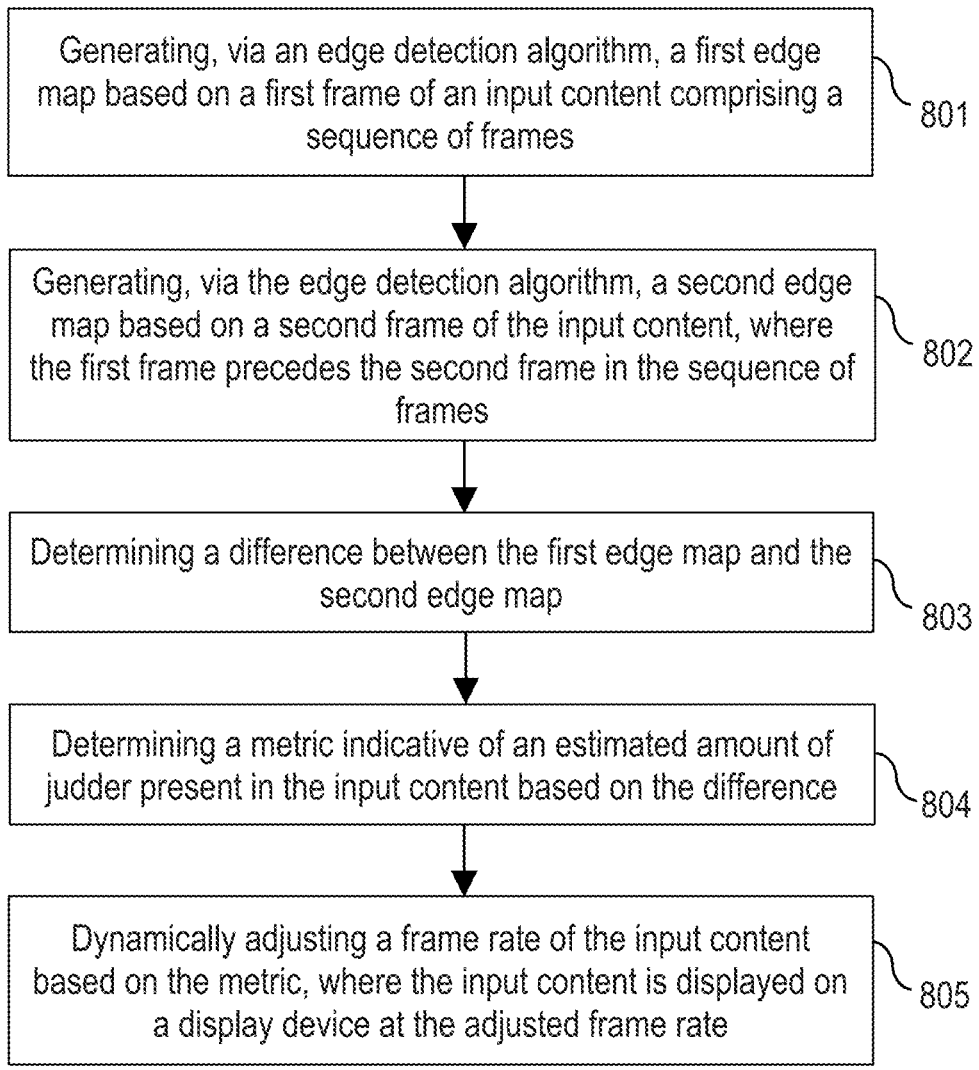
FIG. 7 is a flowchart of an example process for judder detection for dynamic frame rate conversion, in one or more embodiments.

FIG. 7 is a flowchart of an example process 800 for judder detection for dynamic frame rate conversion, in one or more embodiments. Process block 801 includes generating, via an edge detection algorithm, a first edge map based on a first frame of an input content comprising a sequence of frames. Process block 802 includes generating, via the edge detection algorithm, a second edge map based on a second frame of the input content, wherein the first frame precedes the second frame in the sequence of frames. Process block 803 includes determining a difference between the first edge map and the second edge map. Process 804 includes determining a metric indicative of an estimated amount of judder present in the input content based on the difference. Process 805 includes dynamically adjusting a frame rate of the input content based on the metric, where the input content is displayed on a display device at the adjusted frame rate.

In one embodiment, process blocks 801-805 may be performed by one or more components of the frame rate conversion system 500, the frame rate conversion system 550, the judder estimator system 600, and/or the judder estimator system 700.

Figure 8:
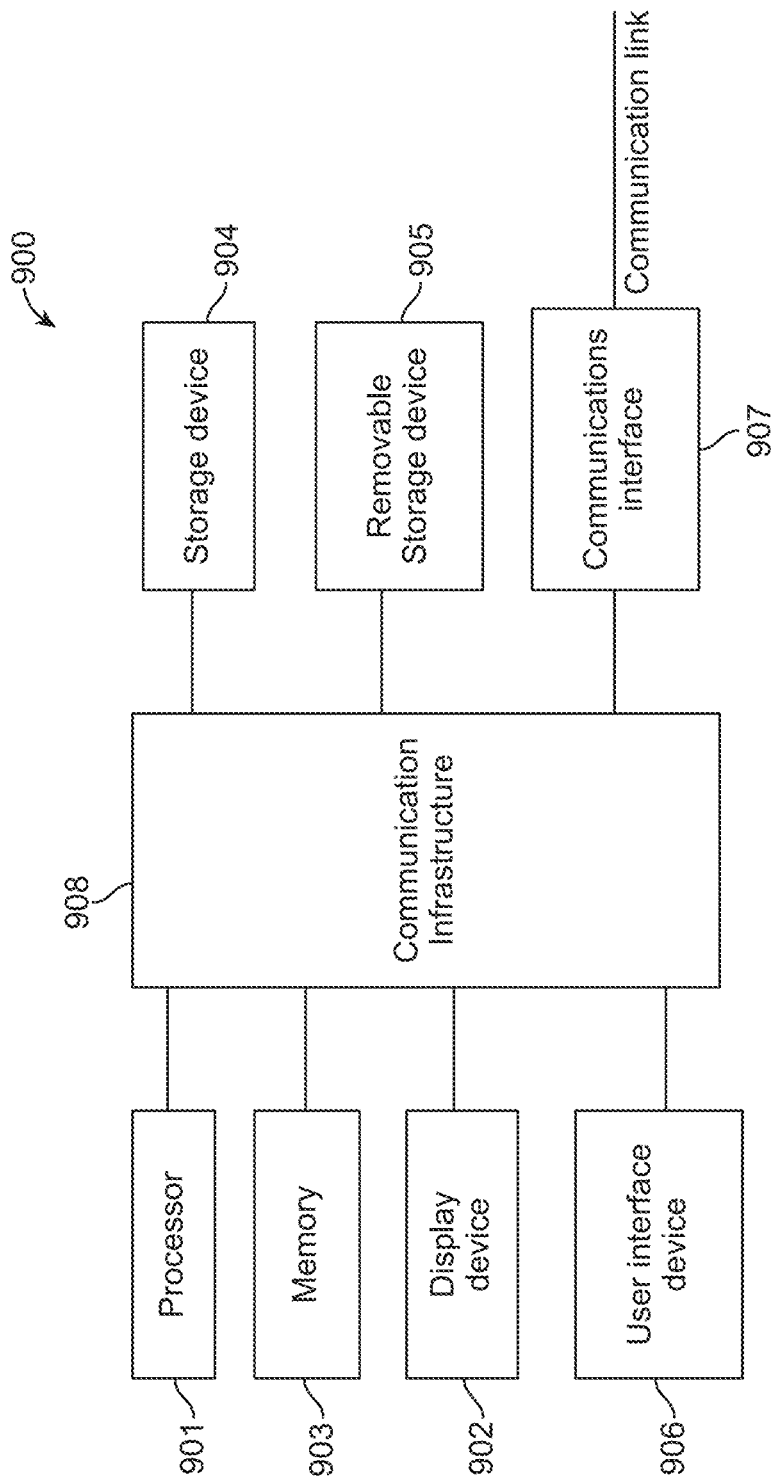
FIG. 8 is a high-level block diagram showing an information processing system comprising a computer system useful for implementing the disclosed embodiments.

FIG. 8 is a high-level block diagram showing an information processing system comprising a computer system 900 useful for implementing the disclosed embodiments. The systems 200, 400, 500, 550, 600, and/or 700 may be incorporated in the computer system 900. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 7) may be stored as program instructions on the memory 903, storage device 904, and/or the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
generating, via an edge detection algorithm, a first set of edge maps based on a first set of subsampled images of a plurality of different resolutions, wherein the first set of subsampled images is sampled from a first frame of an input content comprising a sequence of frames;
generating, via the edge detection algorithm, a second set of edge maps based on a second set of subsampled images of the plurality of different resolutions, wherein the second set of subsampled images is sampled from a second frame of the input content, and the first frame precedes the second frame in the sequence of frames;
determining a set of differences between the first set of edge maps and the second set of edge maps;
determining a metric indicative of an estimated amount of judder present in the input content based on the set of differences and a set of different weights corresponding to the plurality of different resolutions; and
dynamically adjusting a frame rate of the input content by selecting, based on the metric, an optimal frame rate from an optimal frame rate table, wherein the optimal frame rate table maps at least one estimated amount of judder to at least one optimal frame rate, the at least one optimal frame rate is based on one or more preferences, and the input content is displayed on a display device at the selected optimal frame rate as output content;
wherein a first amount of judder present in at least a set of the sequence of frames is different than a second amount of judder present in a corresponding set of a sequence of frames of the output content.

2. The method of claim 1, wherein the input content comprises a portion of a video, the one or more preferences comprises one or more preferences of a content creator of the input content or one or more preferences of a user of the display device, and the second amount of judder present in the corresponding set of the sequence of frames of the output content maintains a creative intent of the content creator of the input content.

3. The method of claim 2, wherein each portion of each frame comprises one of an entirety of the frame or a portion of the frame that is smaller than the entirety of the frame.

4. The method of claim 1, further comprising:
generating the first set of subsampled images by sampling a portion of the first frame at the plurality of different resolutions; and
generating the second set of subsampled images by sampling a portion of the second frame at the plurality of different resolutions.

5. The method of claim 4, wherein the plurality of different resolutions comprises: a first resolution equal to resolution of the input content, and one or more other resolutions that are smaller than the first resolution.

6. The method of claim 1, wherein determining the metric comprises:
determining weighted differences based on the set of differences and the set of different weights.

7. The method of claim 6, wherein the metric is a sum of the weighted differences.

8. The method of claim 6, wherein the metric is a mean of the weighted differences.

9. The method of claim 1, wherein dynamically adjusting the frame rate of the input content comprises:
triggering an increase in the frame rate if the metric exceeds a pre-determined threshold.

10. The method of claim 1, wherein dynamically adjusting the frame rate of the input content comprises:
stopping an increase in the frame rate if the metric does not exceed the pre-determined threshold.

11. A system comprising:
at least one processor; and
a non-transitory processor-readable memory device storing instructions that when executed by the at least one processor causes the at least one processor to perform operations including:
generating, via an edge detection algorithm, a first set of edge maps based on a first set of subsampled images of a plurality of different resolutions, wherein the first set of subsampled images is sampled from a first frame of an input content comprising a sequence of frames;
generating, via the edge detection algorithm, a second set of edge maps based on a second set of subsampled images of the plurality of different resolutions, wherein the second set of subsampled images is sampled from a second frame of the input content, and the first frame precedes the second frame in the sequence of frames;
determining a set of differences between the first set of edge maps and the second set of edge maps;
determining a metric indicative of an estimated amount of judder present in the input content based on the set of differences and a set of different weights corresponding to the plurality of different resolutions; and
dynamically adjusting a frame rate of the input content by selecting, based on the metric, an optimal frame rate from an optimal frame rate table, wherein the optimal frame rate table maps at least one estimated amount of judder to at least one optimal frame rate, the at least one optimal frame rate is based on creative intent of a content creator of the input content, and the input content is displayed on a display device at the selected optimal frame rate as output content;
wherein a first amount of judder present in at least a set of the sequence of frames is different than a second amount of judder present in a corresponding set of a sequence of frames of the output content.

12. The system of claim 11, wherein the input content comprises a portion of a video, and the second amount of judder present in the corresponding set of the sequence of frames of the output content maintains the creative intent of the content creator of the input content.

13. The system of claim 12, wherein each portion of each frame comprises one of an entirety of the frame or a portion of the frame that is smaller than the entirety of the frame.

14. The system of claim 11, wherein the operations further comprise:
generating the first set of subsampled images by sampling a portion of the first frame at the plurality of different resolutions; and
generating the second set of subsampled images by sampling a portion of the second frame at the plurality of different resolutions.

15. The system of claim 14, wherein the plurality of different resolutions comprises: a first resolution equal to resolution of the input content, and one or more other resolutions that are smaller than the first resolution.

16. A non-transitory processor-readable medium that includes a program that when executed by a processor performs a method comprising:
generating, via an edge detection algorithm, a first set of edge maps based on a first set of subsampled images of a plurality of different resolutions, wherein the first set of subsampled images is sampled from a first frame of an input content comprising a sequence of frames;
generating, via the edge detection algorithm, a second set of edge maps based on a second set of subsampled images of the plurality of different resolutions, wherein the second set of subsampled images is sampled from a second frame of the input content, and the first frame precedes the second frame in the sequence of frames;
determining a set of differences between the first set of edge maps and the second set of edge maps;
determining a metric indicative of an estimated amount of judder present in the input content based on the set of differences and a set of different weights corresponding to the plurality of different resolutions; and
dynamically adjusting a frame rate of the input content by selecting, based on the metric, an optimal frame rate from an optimal frame rate table, wherein the optimal frame rate table maps at least one estimated amount of judder to at least one optimal frame rate, the at least one optimal frame rate is based on creative intent of a content creator of the input content, and the input content is displayed on a display device at the selected optimal frame rate as output content;
wherein a first amount of judder present in at least a set of the sequence of frames is different than a second amount of judder present in a corresponding set of a sequence of frames of the output content.

17. The method of claim 16, wherein the second amount of judder present in the corresponding set of the sequence of frames of the output content maintains the creative intent of the content creator of the input content.

* * * * *